United States Patent [19]

Marazzi

[11] 4,387,287
[45] Jun. 7, 1983

[54] METHOD FOR A SHAPING OF POLYCRYSTALLINE SYNTHETIC DIAMOND

[75] Inventor: Silvio Marazzi, Cavigliano, Switzerland

[73] Assignee: Diamond S.A., Losone-Locarno, Switzerland

[21] Appl. No.: 318,590

[22] Filed: Nov. 5, 1981

Related U.S. Application Data

[63] Continuation of Ser. No. 50,146, Jun. 19, 1979, abandoned.

[30] Foreign Application Priority Data

Jun. 29, 1978 [CH] Switzerland .............................. 77/78

[51] Int. Cl.³ ................................................ B23P 1/00
[52] U.S. Cl. .................................. 219/69 M; 219/69 R
[58] Field of Search ............................ 219/69 M, 69 R

[56] References Cited

U.S. PATENT DOCUMENTS

| 2,385,198 | 9/1945 | Engle | 219/69 M |
|---|---|---|---|
| 2,476,965 | 7/1949 | Emerson et al. | 219/69 M |
| 2,552,582 | 5/1951 | Peters et al. | 219/69 M |
| 2,635,487 | 4/1953 | Potter et al. | 219/69 M |
| 2,939,941 | 6/1960 | Heerschap et al. | 219/69 M |
| 4,103,137 | 7/1978 | Levitt et al. | 219/69 M |

FOREIGN PATENT DOCUMENTS

| 856874 | 11/1952 | Fed. Rep. of Germany . |  |
|---|---|---|---|
| 2404857 | 8/1974 | Fed. Rep. of Germany ... | 219/69 M |
| 1031411 | 6/1953 | France . |  |
| 1094969 | 5/1955 | France . |  |
| 4631276 | 4/1967 | Japan | 219/69 M |

Primary Examiner—C. C. Shaw
Attorney, Agent, or Firm—Wender, Murase & White

[57] ABSTRACT

The present invention refers to a method for the shaping of polycrystalline, synthetic diamond and, in particular, to the production of profiled parts like tools. The shaping process is performed by spark erosion with electrodes shaped accordingly.

3 Claims, 6 Drawing Figures

METHOD FOR A SHAPING OF POLYCRYSTALLINE SYNTHETIC DIAMOND

This is a continuation of application Ser. No. 50,146, filed June 19, 1979, now abandoned.

BACKGROUND OF THE INVENTION

The present invention refers to a method for the shaping of polycrystalline synthetic diamond. In prior art methods it is almost impossible and economically quite prohibitive to produce parts, in particular tools, of natural or synthetic diamond with optionally formed edges and faces. It is therefore an object of the present invention to provide a method for economically producing parts of diamond, in particular tools, with optionally shaped faces and edges.

BRIEF SUMMARY OF THE INVENTION

This object is attained in that the processing is performed by spark erosion, whereby a current at low voltage flows on the whole surface to be worked on, between the diamond and an electrode, with essentially equal average current density. Because synthetic, polycrystalline diamonds are generally sintered bodies with a metallic and thus electrically conducting binding materials a processing by spark erosion is possible, whereby practically only the binding material is reduced. The surface quality and consequently the form and precision of cutting edges of tools which can be obtained, is thus determined by the size of the grains of the diamond parts. The size of the grains can be for example 0.04–0.1 μm, leading to a very high surface quality for precision. Thereby a relatively fast erosion of the material can be attained, with a penetration speed of the electrode of about 0.25 mm/min.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
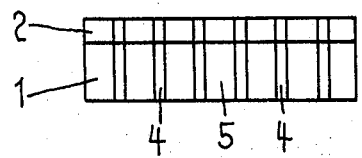
FIG. 1 is a front elevational view of a trueing tool and workpiece for use in connection with the method according to the present invention.
Figure 2:
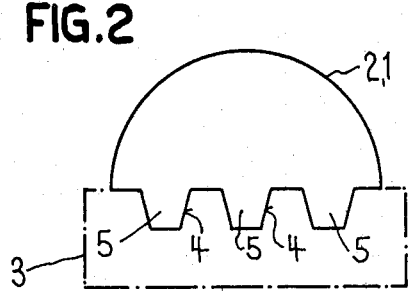
FIG. 2 is a top plan view of the tool and workpiece of FIG. 1, also showing in phantom lines a preferred spark electrode for use therewith.

The trueing tool shown in FIG. 1 presents a layer 2 of polycrystalline, synthetic diamond on a suitable, for example metallic, support 1. The production of a blank with the support 1 and the layer 2 is known per se. As diamond, a material known under the tradename "Compax" or "Syndite" can be used. The front side is then profiled throughout, that is on both layers 1 and 2 by eroding grooves 4 with an electrode 3, which is indicated by a dot-and-dash pattern in FIG. 2, thus creating teeth 5. The electrode 3 has exactly the counterprofile of the profile to be produced.

Figure 3:
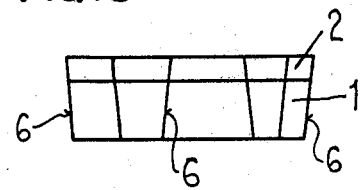
FIG. 3 is a front elevational view of a profiled cutting tool for use with the method according to the present invention.
Figure 4:
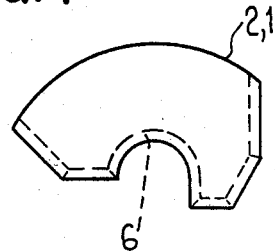
FIG. 4 is a top plan view of the profiled cutting tool of FIG. 3.

FIGS. 3 and 4 show a further tool with a profiled true rake. In this case one electrode or if necessary a plurality of electrodes, used together or one after the other, have to be used, which electrodes not only allow erosion of the desired profile but also the required clearance angles with respect to rakes 6. The other respective parts are designated as in FIG. 1 and 2.

Figure 5:
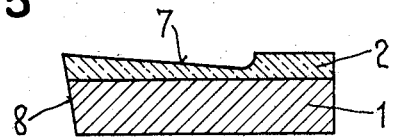
FIG. 5 is a cross-sectional view of an edge tool and workpiece produced by the method according to the present invention.
Figure 6:
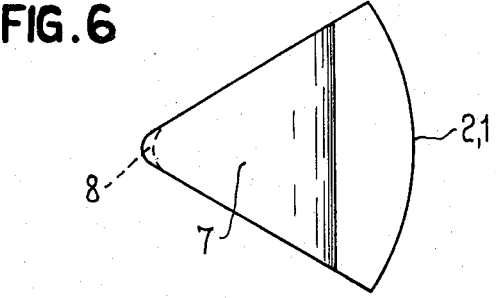
FIG. 6 is a top plan view of the workpiece and tool of FIG. 5.

FIGS. 5 and 6 show a further trueing tool with a profiled true rake. In this case a spark electrode is used which is lowered from above towards the top surface of the diamond layer 2, for forming the profile of the rake, relative the flat step 7. In a second phase, the rake 8 is formed by erosion if not present in the blank.

As already mentioned the forming can partially be performed at the blank during the production of the synthetic, polycrystalline diamond layer 2 on support 1. It is thus possible to form the teeth 5 according to FIGS. 1 and 2, the profile form according to FIG. 4 and the rakes 8 according to FIG. 5 already during the production of the blank. It is thus only necessary to finish the piece for the definitive dimensions of the desired definitive shape by spark erosion.

The described embodiments apply to all tools or parts of tools. The invention however is not limited to these applications. In a like manner any highly stressed parts of all kinds, like bearings, working parts and the like can be produced.

I claim:

1. A method for shaping processing of polycrystalline synthetic diamond by spark erosion, comprising the steps of:
   providing a shaping electrode having a shaping surface;
   providing a workpiece of polycrystalline synthetic diamond consisting essentially of diamond particles in a conductive binding material;
   applying said shaping electrode against said workpiece; and
   setting up a current having an equal average current density on the whole shaping surface flowing between said electrode and the conductive binding material of said workpiece, so as to uniformly erode the binding of material of said synthetic diamond and thereby accurately shape said workpiece in accordance with said shaping surface of said electrode.

2. A method according to claim 1, wherein said workpiece is roughly shaped during production thereof from synthetic diamond, whereafter the workpiece is finished and its surface is accurately shaped by applying said electrode and setting up said current.

3. A method for shaping processing of polycrystalline synthetic diamond by spark erosion comprising the steps of:
   providing a workpiece of polycrystalline diamond consisting essentially of diamond particles in a conductive binding material, and a shaping electrode having a shaping surface exactly the counterprofile of the profile to be formed on said workpiece;
   applying said shaping surface of said shaping electrode against said workpiece; and
   setting up a current having an equal average current density on the whole shaping surface flowing between said electrode and the conductive binding material of said workpiece, so as to uniformly erode said binding material of said synthetic diamond and release said diamond particles so as to shape accurately said workpiece in accordance with said shaping surface of said electrode.

* * * * *